(12) United States Patent
Noro et al.

(10) Patent No.: US 10,414,309 B2
(45) Date of Patent: Sep. 17, 2019

(54) VEHICLE SEAT MEMBER AND METHOD OF MANUFACTURING SAME

(71) Applicant: SEKISUI PLASTICS CO., LTD., Osaka (JP)

(72) Inventors: Kenta Noro, Nara (JP); Yasuhiro Yamasaki, Nara (JP); Yushi Sakakibara, Nara (JP); Atsushi Fukuta, Nara (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days.

(21) Appl. No.: 16/325,967

(22) PCT Filed: Aug. 10, 2017

(86) PCT No.: PCT/JP2017/029159
§ 371 (c)(1),
(2) Date: Feb. 15, 2019

(87) PCT Pub. No.: WO2018/034243
PCT Pub. Date: Feb. 22, 2018

(65) Prior Publication Data
US 2019/0176669 A1 Jun. 13, 2019

(30) Foreign Application Priority Data

Aug. 17, 2016 (JP) .................................. 2016-160230
Aug. 22, 2016 (JP) .................................. 2016-162035
Aug. 25, 2016 (JP) .................................. 2016-165049

(51) Int. Cl.
*B60N 2/70* (2006.01)
*A47C 7/18* (2006.01)
(Continued)

(52) U.S. Cl.
CPC ............ *B60N 2/7017* (2013.01); *A47C 7/185* (2013.01); *A47C 7/20* (2013.01); *B29C 44/12* (2013.01); *B29L 2031/30* (2013.01)

(58) Field of Classification Search
CPC ......... B60N 2/7017; A47C 7/185; A47C 7/20; A47C 7/18; B29C 44/12; B29C 44/1214; B29L 2031/30
(Continued)

(56) References Cited

U.S. PATENT DOCUMENTS 6,033,024 A * 3/2000 Pfau ......................... A47C 7/20
297/284.9
6,233,826 B1 * 5/2001 Wycech .............. B29C 44/1242
29/897.1
(Continued)

FOREIGN PATENT DOCUMENTS

JP 2001-161508 6/2001
JP 2015-174340 10/2015
(Continued)

OTHER PUBLICATIONS

International Search Report dated Oct. 24, 2017 in corresponding International Application No. PCT/JP2017/029159.
(Continued)

*Primary Examiner* — Mark R Wendell
(74) *Attorney, Agent, or Firm* — Wenderoth, Lind & Ponack, L.L.P.

(57) ABSTRACT

The method manufactures a vehicular seat member including a frame member and a foamed resin molded body to embed the frame member. Firstly the frame member is placed in a molding die so that the frame member extends along the outer shape of the vehicular seat member in plan view of the vehicular seat member. Next the foamed resin molded body is formed in the molding die so that the foamed resin molded body has a rim part embedding the frame member and having an outer shape of the vehicular seat member and an extension extending inward from the rim part so as to bridge the rim part inside of the rim part. During the forming, the method forms a break in the extension so as
(Continued)

to divide the extension along the direction intersecting the extending direction of the extension.

10 Claims, 18 Drawing Sheets

(51) Int. Cl.
*B29C 44/12* (2006.01)
*A47C 7/20* (2006.01)
*B29L 31/30* (2006.01)

(58) Field of Classification Search
USPC .................................. 297/452.22, 452.26
See application file for complete search history.

(56) References Cited

U.S. PATENT DOCUMENTS

| | | | |
|---|---|---|---|
| 6,571,411 B1 | 6/2003 | Ebe | |
| 8,360,530 B2* | 1/2013 | Onoda | B60N 2/646 |
| | | | 297/452.21 |
| 2002/0017733 A1* | 2/2002 | Kobayashi | B29C 44/0469 |
| | | | 264/45.4 |
| 2010/0026077 A1* | 2/2010 | Tarumi | A47C 7/021 |
| | | | 297/452.62 |
| 2017/0057130 A1 | 3/2017 | Sameshima et al. | |
| 2017/0252952 A1 | 9/2017 | Takayama et al. | |
| 2017/0334106 A1 | 11/2017 | Sameshima et al. | |
| 2018/0297490 A1* | 10/2018 | Murata | B29C 43/18 |
| 2019/0014907 A1* | 1/2019 | Hisamatsu | B60N 2/90 |

FOREIGN PATENT DOCUMENTS

| | | | |
|---|---|---|---|
| JP | 2018029756 | * | 3/2018 |
| WO | 2015-159691 | | 10/2015 |
| WO | 2016/042759 | | 3/2016 |
| WO | 2016/152530 | | 9/2016 |

OTHER PUBLICATIONS

International Preliminary Report on Patentability dated Feb. 19, 2019 in corresponding International Application No. PCT/JP2017/029159.

* cited by examiner (a)

(b)

(c)

(a)

(b)

VEHICLE SEAT MEMBER AND METHOD OF MANUFACTURING SAME

TECHNICAL FIELD

The present invention relates to vehicular seat members and methods for manufacturing the same.

BACKGROUND ART

A seat member for vehicles, such as automobiles, has been known, which includes a foamed resin molded body integrally formed with a frame member (see Patent Literatures 1 and 2, for example).

Patent Literature 3 discloses a method for manufacturing a vehicular seat member. The method integrally molds a frame member including securing attachments for securement to a vehicle and a connecting member connecting the securing attachments while embedding them in a molded article of expandable beads. The connecting member is embedded in a front portion of the molded article of expandable beads along the longitudinal direction of the seat member. Patent Literature 3 describes a notch formed in the molded article of expandable beads where the upright frame of each securing attachment is embedded. The notch is formed on an outer part of the seat member in the longitudinal direction, and extends from the upright frame outwardly in the longitudinal direction.

CITATION LIST

Patent Literatures

Patent Literature 1: JP 2001-161508 A
Patent Literature 2: WO2015/159691
Patent Literature 3: WO2016/042759

SUMMARY OF INVENTION

Technical Problem

As stated above, the vehicular seat described in Patent Literatures 1 to 3 includes a seat member having a frame member that is integrally molded inside of a foamed resin molded body. The frame member and the foamed resin molded body are made of different materials, and so have different coefficients of thermal expansion. The foamed resin molded body therefore is different in thermal expansion and thermal contraction between a part of the expandable resin without the frame member and a part of the expandable resin with the frame member embedded.

This may cause a slight deformation from a predetermined shape of the foamed resin molded body at a part without the frame member during heat dissipation when the foamed resin molded body is released from the mold or when heat is input to the vehicular seat member, for example.

Solution to Problem

To solve the above problem, a method for manufacturing a vehicular seat member of the present invention manufactures a vehicular seat member including a frame member and a foamed resin molded body to embed the frame member, and the method includes: a placing step of placing the frame member in a molding die so that the frame member extends along an outer shape of the vehicular seat member in plan view of the vehicular seat member; and a forming step of forming the foamed resin molded body in the molding die so that the foamed resin molded body has a rim part embedding the frame member and having an outer shape of the vehicular seat member and an extension extending inward from the rim part so as to bridge the rim part inside of the rim part. During the forming step or after the forming step, at least one of a cutout groove, a notch and a break that divides the extension is formed in the extension along a direction intersecting an extending direction of the extension.

The vehicular seat member is different in apparent thermal contraction between a rim part of the foamed resin molded body with the frame member embedded and an extension extending inside the rim part without the frame member. This causes compressive stress or tensile stress as thermal stress non-uniformly acting on the extension surrounded with the rim part and causes easy deformation of the extension. The present invention can suppress such deformation.

More specifically the method of the present invention forms a cutout groove or a notch in the extension extending inside of the rim part along the direction intersecting the extending direction of the extension during or after the forming step. This can release thermal stress acting on the surface of the extension due to thermal contraction and can suppress the deformation of the extension. The method may form a break that divides the extension along the direction intersecting the extending direction of the extension. The resulting extension includes the divided parts, and each divided part has a free end. This also can suppress thermal stress acting on the extension when the extension thermally contracts. As a result, the vehicular seat member manufactured can have excellent dimensional accuracy.

In a preferable embodiment, the frame member has a continuous part of opposed parts across a space inside of the rim part, and the forming step forms the extension so as to extend between the opposed parts.

Both ends of the extension are bound to the rim part where the continuous part of the frame member is embedded, and so such an extension easily deforms due to thermal contraction. Even in such a case, the extension in this aspect includes at least one of a cutout groove, a notch and a break, which can suppress the deformation of the extension.

In a preferable embodiment, the outer shape of the vehicular seat member in plan view has a shape having a transverse direction and a longitudinal direction, and the forming step forms the extension including a first extension part between the opposed parts of the rim part and extending at least along the longitudinal direction and forms at least one of the cutout groove, the notch and the break in the first extension part.

The first extension part along the longitudinal direction easily deforms due to thermal contraction. The extension in this aspect, however, has at least one of a cutout groove, a notch and a break formed during the forming of the first extension part, and so can suppress the deformation due to thermal contraction.

In a preferable embodiment, the cutout groove widens from a bottom to an opening of the groove. Such an embodiment having the cutout groove that widens from a bottom to an opening of the groove can release thermal stress acting on the surface of the extension or the vicinity along the extending direction during thermal contraction, and can suppress thermal deformation of the extension.

In a preferable embodiment, the frame member circles around along the outer shape of the vehicular seat member. This embodiment including the frame member that circles around along the outer shape of the vehicular seat member can increase the strength of the vehicular seat member. Such a frame member that circles around along the outer shape of the vehicular seat member bounds both sides of the extension, and so the extension easily deforms due to thermal contraction. Even in such a case, the extension in this aspect includes at least one of a cutout groove, a notch and a break, which can suppress the deformation of the extension effectively.

The present description further discloses a vehicular seat member. A vehicular seat member of the present invention includes a frame member and a foamed resin molded body to embed the frame member. The frame member extends along an outer shape of the vehicular seat member in plan view of the vehicular seat member, the foamed resin molded body includes a rim part embedding the frame member and having the outer shape of the vehicular seat member, and an extension that extends inward from the rim part so as to bridge the rim part inside of the rim part, and the extension includes at least one of a cutout groove, a notch and a break that divides the extension along a direction intersecting an extending direction of the extension.

When heat is input to (the input heat is released from) the vehicular seat member, the foamed resin molded body has different amounts of apparent thermal expansion (thermal contraction) between the rim part where the frame member is embedded and the extension without the frame member and extending inside of the rim part. This causes compressive stress or tensile stress as thermal stress non-uniformly acting on the extension surrounded with the rim part and causes easy deformation of the extension. The present invention can suppress such deformation.

More specifically the method of the present invention forms a cutout groove or a notch in the extension extending inside of the rim part along the direction intersecting the extending direction of the extension. This can release thermal stress acting on the surface of the extension and can suppress the deformation of the extension. The method may form a break that divides the extension along the direction intersecting the extending direction of the extension. The resulting extension includes the divided parts, and each divided part has a free end. This also can suppress thermal stress acting on the extension when the extension thermally expands or contracts. As a result, at least one of the cutout groove, the break and the notch formed in the extension can achieve excellent dimensional accuracy of the vehicular seat member.

In a preferable embodiment, the frame member has a continuous part of opposed parts across a space inside of the rim part, and the extension extends between the opposed parts.

Both ends of the extension are bound to the rim part where the continuous part of the frame member is embedded, and so such an extension especially easily deforms due to thermal expansion and thermal contraction. Even in such a case, the extension in this aspect includes at least one of a cutout groove, a notch and a break, which can suppress the deformation of the extension.

In a preferable embodiment, the outer shape of the vehicular seat member in plan view has a shape having a transverse direction and a longitudinal direction, and the extension includes a first extension part between the opposed parts of the rim part and extending along the longitudinal direction. At least one of the cutout groove, the notch and the break is formed in the first extension part. The first extension part along the longitudinal direction easily deforms due to thermal expansion and thermal contraction. The extension in this aspect, however, has at least one of a cutout groove, a notch and a break, and so can suppress the deformation.

In a preferable embodiment, the cutout groove widens from a bottom to an opening of the groove. Such an embodiment having the cutout groove that widens from a bottom to an opening of the groove can release thermal stress acting on the surface of the extension or the vicinity along the extending direction during thermal expansion and thermal contraction, and can suppress thermal deformation of the extension.

In a preferable embodiment, the frame member circles around along the outer shape of the vehicular seat member. This embodiment including the frame member that circles around along the outer shape of the vehicular seat member can increase the strength of the vehicular seat member. Such a frame member that circles around along the outer shape of the vehicular seat member bounds both sides of the extension, and so the extension easily deforms due to thermal expansion and thermal contraction. Even in such a case, the extension in this aspect includes at least one of a cutout groove, a notch and a break, which can suppress the deformation of the extension effectively.

Advantageous Effects of Invention

The method for manufacturing a vehicular seat member of the present invention can manufacture a vehicular seat member having excellent dimensional accuracy. The vehicular seat member of the present invention can keep enough dimensional accuracy of the vehicular seat member when heat is input to the vehicular seat member or the input heat is released from the vehicular seat member.

BRIEF DESCRIPTION OF DRAWINGS

FIG. 6($a$) is a cross-sectional view when the molding die is filled with pre-expanded resin particles, FIG. 6($b$) is a cross-sectional view when, following (a), the pre-expanded resin particles are expanded to form a foamed resin molded body, and FIG. 6($c$) shows the foamed resin molded body that is released from the molding die after (b).

FIG. 7($a$) is a cross-sectional view when pre-expanded resin particles are expanded to form a foamed resin molded body, and FIG. 7($b$) shows the foamed resin molded body that is released from the molding die after (a).

9(a), and FIG. 9(f) is a schematic cross-sectional view of a notch and the vicinity thereof.

DESCRIPTION OF EMBODIMENTS

Figure 1:
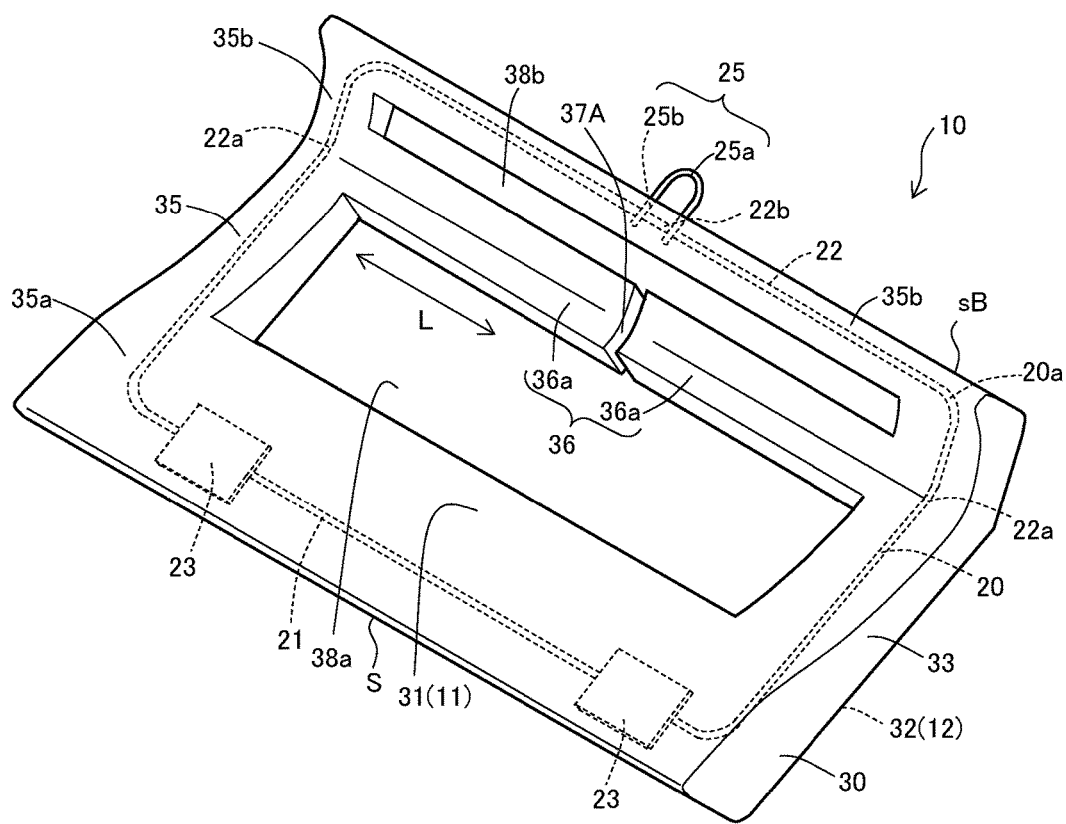
FIG. 1 is a schematic perspective view from the above of a vehicular seat member according to a first embodiment of the present invention.

Referring to the drawings, the following describes some embodiments of a vehicular seat member and a vehicular seat according to the present invention. The present invention is not limited to the following embodiments.
<First Embodiment>
1. Vehicular Seat Member 10

Referring to FIGS. 1 to 7, the following describes a vehicular seat member and a method for manufacturing the vehicular seat member that is a first embodiment.

Figure 2:
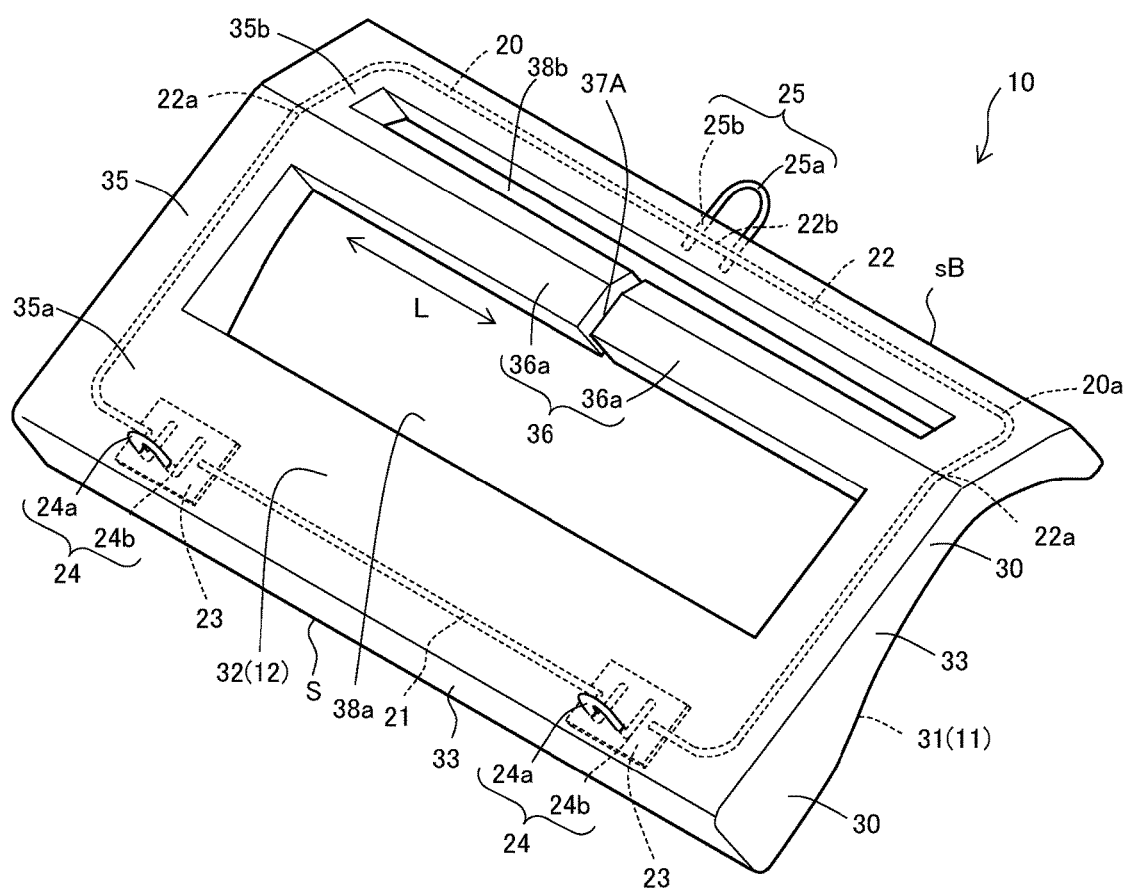
FIG. 2 is a schematic perspective view from the below of the vehicular seat member of FIG. 1.

As shown in FIG. 1 and FIG. 2, the vehicular seat member 10 basically includes a frame member 20 and a foamed resin molded body 30 to embed at least a part of the frame member 20.

Figure 3:
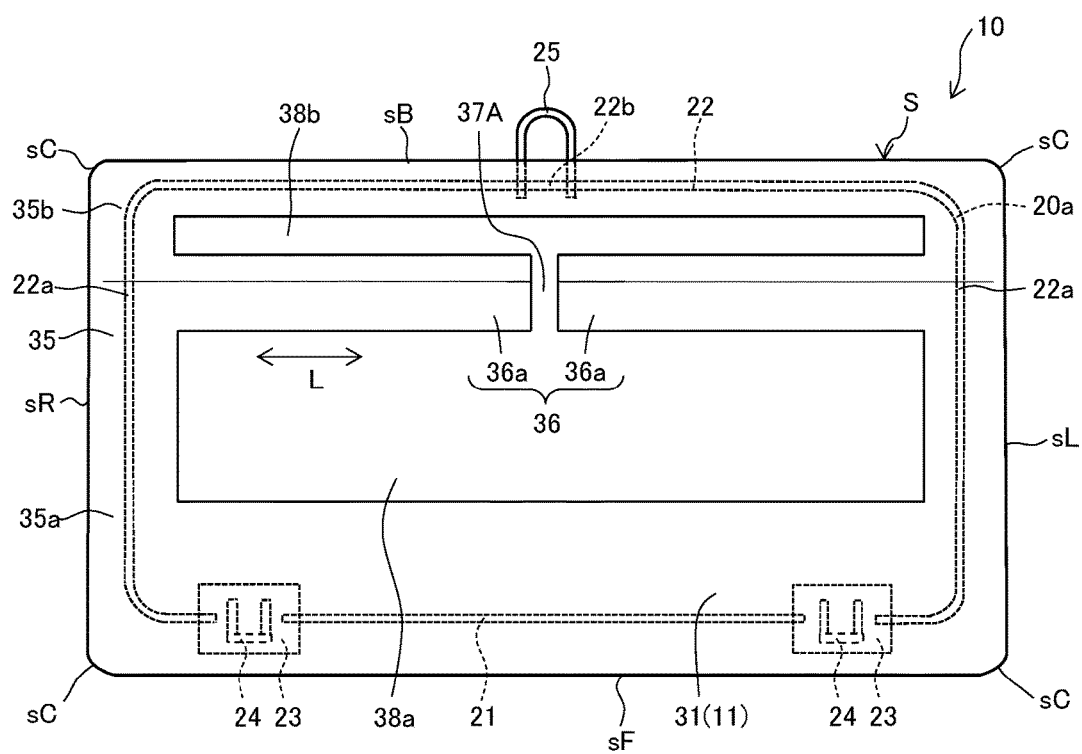
FIG. 3 is a plan view of the vehicular seat member of FIG. 1.

The overall shape of the vehicular seat member 10 is not limited especially, and the vehicular seat member typically has a rectangular shape in plan view as shown in FIG. 3. The rectangle in this description refers to quadrangles including, but not limited to, a rectangle and a square. The rectangles also may include a trapezoid and a parallelogram. The rectangle in this description includes a substantially rectangular shape as well, e.g., a rectangle having round corners or a rectangle having a partially or entirely curved side.

As shown in FIG. 3, the outer shape S of the vehicular seat member 10 of the present embodiment in plan view is a rectangle having short sides and long sides and having a transverse direction and a longitudinal direction. The outer shape S has four sides, including a right edge sR and a left edge sL at the short sides and a front edge sF and a rear edge sB at the long sides as well as corners sC at the four corners. Front, read and left and right in this description refer to the directions relative to the line of sight of a passenger when the passenger is seated in the vehicle and faces in the travelling direction (forward) of the vehicle.

Figure 4:
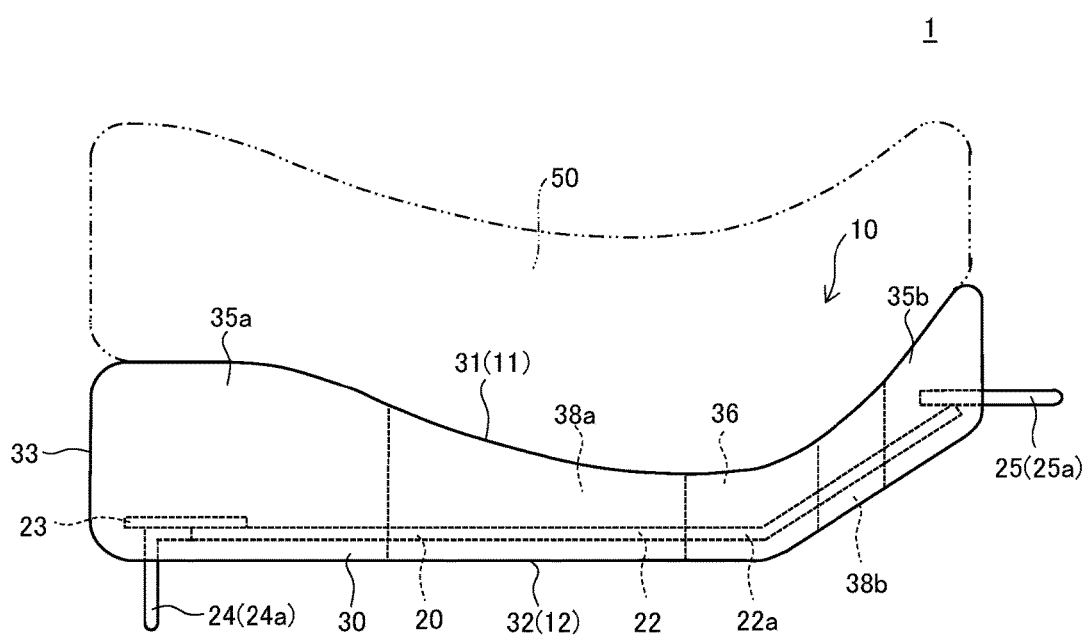
FIG. 4 is a left side view of the vehicular seat member of FIG. 1.

As shown in FIG. 4, an appropriate upper seat member 50, such as a cushioning material, is overlaid on the upper face 11 of the vehicular seat member 10, i.e., on the upper face 31 of the foamed resin molded body 30 to be a vehicular seat 1. The vehicular seat member 10 together with the cushioning material may be covered with an appropriate exterior material to be the vehicular seat 1.

1-1. Frame Member 20

As shown in FIG. 1 and FIG. 2, the frame member 20 is embedded in the foamed resin molded body 30 to give a necessary shape-retention ability and strength to the foamed resin molded body. The frame member 20 is typically made of a material whose dimensions do not change substantially as compared with the foamed resin molded body 30 under the conditions to form the foamed resin molded body 30. Typical examples of such a material include metal materials, such as steel and aluminum.

The frame member 20 includes first and second frame parts 21 and 22 that internally extend in the foamed resin molded body 30 along the outer shape S of the vehicular seat member 10 in plan view, and a pair of bases 23, 23 connecting to the ends of the first and second frame parts 21 and 22.

The frame member 20 further includes a front locking part 24 attached to each of the bases 23 and a rear locking part 25 attached to the second frame part 22. The first and second frame parts 21 and 22 and the front and rear locking parts 24 and 25 of the present embodiment may include a metal wire, such as steel and aluminum, having the diameter of about 3 to 6 mm, for example. They may be a metal belt-like or tubular steel member. The frame member 20 may be manufactured by punching or pressing of a steel plate.

The first frame part 21 of the frame member 20 is placed along a center part of the front edge sF and close to the front edge. The second frame part 22 is placed along both sides of the front edge sF and along the right edge sR, the left edge sL, the rear edge sB, and the corners sC and close to these parts. The frame member 20 is embedded at a part along the outer shape S of the vehicular seat member 10 and slightly inside of the outer face 33 of the foamed resin molded body 30 that defines the outer shape S.

In this way, the frame member 20, which includes the first and second frame parts 21 and 22 and the pair of bases 23, 23 connecting these frame parts, circles around along the outer shape S of the vehicular seat member 10 without gaps. The frame member 20 of the present embodiment circles around along the outer shape S of the vehicular seat member 10 without gaps. In another example, the frame member 20 may circle around along the outer shape S of the vehicular seat member 10 with gaps. That is, the frame member is not limited to the above embodiment, and may include a frame part only at a part along the outer shape S. For instance, the second frame part 22 does not connect to the bases 23, 23, and may be placed along the rear edge sB. The number of the frame parts of the frame member 20 also is not limited to two, which may be one or three or more.

The foamed resin molded body 30 described later is a substantially rectangle in plan view, and the frame member 20 defines a continuous loop-like body 20a including the first frame part 21, the second frame part 22 and the bases 23, which are embedded in the foamed resin molded body 30. In one example of the present embodiment, the body 20a includes a pair of opposed long-side parts and a pair of short-side parts connecting to both ends of the long-side parts. At each of the long-side parts, the front locking parts (protrusions) 24, 24 or the rear locking part 25 is formed. The body 20a circles around the inside of the foamed resin molded body 30 so that a continuous loop is defined inside of the foamed resin molded body 30 along the outer shape of the foamed resin molded body 30 in plan view.

Such front locking parts formed at the long-side part are easily affected from thermal contraction of the foamed resin molded body 30 for the accuracy of position. To avoid this, the foamed resin molded body 30 of the present embodiment includes at least one of a break 37A, a cutout groove 37B, and a notch 37C described later at an extension 36 of the foamed resin molded body 30, whereby the accuracy of position of the front locking parts 24, 24 can be kept.

Such deterioration of the accuracy of position of the front locking parts 24, 24, which results from thermal contraction of the foamed resin molded body 30, for example, can be reduced by removing the resin as the foamed resin molded body 30 around the front locking parts 24, 24. Note here that proximal ends 24b of each front locking part 24 may be embedded in the foamed resin molded body 30 by forming at least one of the break 37A, the cutout groove 37B, and the notch 37C at the extension 36 of the foamed resin molded body 30 as described later. Such a break, a cutout groove or a notch can reduce non-uniformity of thermal contraction in the longitudinal direction and can keep the accuracy of position of the front locking parts 24, 24.

The front locking parts 24 and the rear locking part 25 of the frame member 20 lock the vehicular seat member 10 to the vehicle. Each front locking part 24 connects to the corresponding base 23 by welding or bonding, for example, and protrudes downward from the base 23. The front locking part 24 has a distal end 24a that is curved like a substantially U-letter shape and is exposed from the foamed resin molded body 30, and the proximal end 24b that is embedded in the foamed resin molded body 30 together with the base 23. More specifically the proximal end 24b as a whole is surrounded by and is embedded in the foamed resin molded body 30. This can keep the front locking parts 24 in the foamed resin molded body 30 when a force to pull out the front locking part 24a is applied during locking of the vehicular seat member 10 of the present embodiment to the vehicle via their distal ends 24a, and so the vehicular seat member can increase resistance to such a force to pull out the front locking parts.

The rear locking part 25 protrudes rearward from a center part 22b of the second frame part 22 along the rear edge sB. The rear locking part 25 has a distal end 25a that is curved like a substantially U-letter shape and is exposed from the foamed resin molded body 30, and a proximal end 25b that is embedded in the foamed resin molded body 30.

The proximal ends 24a and 25a of the front locking parts 24 and the rear locking part 25 of the present embodiment have a substantially U-letter shape formed by bending wire. They are not limited to this configuration, and may have any configuration suitable for the structure of the vehicle to lock the seat member to the vehicle.

Each of the front locking parts 24 of the present embodiment joins to both of the first and second frame parts 21 and 22 via the corresponding base 23. The front locking parts 24 are not limited to this embodiment, and may directly join to both of the first and second frame parts 21 and 22 without the base 23 between them as in the rear locking part 25. The number of the front locking parts 24 also is not limited especially, which may be one or three or more. One of the front locking parts 24 and the rear locking part 25 may be omitted.

1-2. Foamed Resin Molded Body 30

As shown in FIG. 1 and FIG. 2, the foamed resin molded body 30 is a molded foam obtained by forming expandable resin in a mold. The expandable resin is not limited especially, and a foamed thermoplastic resin is typically used. For instance, polystyrene expandable resin, composite expandable resin including polystyrene resin and polyolefin resin, and polyolefin expandable resin are preferably used. Expansion ratio can be adjusted appropriately for the types of expandable resin, which is generally about 10 to 50 times, and typically about 20 to 40 times.

For the expandable resin, polystyrene expandable resin or composite expandable resin including polystyrene resin and polyolefin resin is particularly preferable. Such polystyrene expandable resin or composite expandable resin including polystyrene resin and polyolefin resin thermally expands or contracts less, and so is particularly preferable to suppress the deformation of the foamed resin molded body and the frame member. Expansion ratio can be adjusted appropriately in accordance with the types of expandable resin.

The foamed resin molded body 30 has the upper face 31 on the side where a passenger of the vehicle is seated and the bottom face 32 that is fastened to the vehicle. The foamed resin molded body 30 has a rim part 35 to embed the frame member 20 and define the outer shape S of the vehicular seat member 10 in plan view of the vehicular seat member 10. The rim part 35 includes a front part 35a that is located at a front part of the seat when the vehicular seat member 10 is attached to be a seat, and a rear part 35b that is integrally formed with the front part 35a and is inclined rearward. When the vehicular seat member 10 is assembled in a vehicle, the front part 35a of the foamed resin molded body 30 supports the upper legs of the passenger and the rear part 35b supports the buttocks of the passenger.

More specifically as shown in FIG. 4, the upper face 31 of the foamed resin molded body 30 is a curved surface that is depressed downward so that a part close to the rear end of the front part 35a is the deepest part in the illustrated example. Such a curved surface can hold the upper legs and the buttocks of a passenger via the upper seat member 50. The shape and the thickness of the foamed resin molded body 30 can change variously depending on the shape of the vehicle body to be attached to the vehicular seat member 10, and are not limited to the illustrated embodiment. For instance, the upper face 31 of the foamed resin molded body 30 may be substantially flat.

The foamed resin molded body 30 includes the extension 36 that extends from the inside of the rim part 35 so as to bridge the rim part 35 inside of the rim part 35. More specifically, the frame member 20 of the present embodiment has opposed parts 22a and 22a across the space inside of the rim part 35 so that the opposed parts are continuous to define the second frame part 22 (continuous part). The extension 36 extends between the opposed parts 22a and 22a.

Such an extension 36 is a reinforcing part to reinforce the vehicular seat member 10. The extension 36 formed in the space inside of the rim part 35 defines hollows 38a and 38b at the front part 35a and the rear part 35b, respectively, of the foamed resin molded body 30. These hollows 38a and 38h are intended to make the foamed resin molded body 30 lighter in weight or to contain other members of the vehicular seat (e.g., a cushioning material and a console box that are easily deformed than the foamed resin molded body 30).

As shown in FIGS. 1 to 3, the extension 36 of the foamed resin molded body 30 has the break 37A that divides the extension 36 along the direction intersecting the extending direction L of the extension 36. More specifically the extending direction L of the extension 36 coincides with the longitudinal direction of the vehicular seat member 10, and the break 37A is formed in the transverse direction orthogonal to the longitudinal direction. This means that the extension 36 includes two divided parts 36a and 36a, and these divided parts 36a have free ends at their distal ends. Note here that the width of the break 37A is not limited as long as it divides the extension 36. In order to keep enough strength of the foamed resin molded body 30, the width of the break 37A (i.e., the gap between the divided parts 36a and 36a) is preferably 20% or less of the length of the extension 36 without a break 37A in the longitudinal direction (extending direction L), more preferably 10% or less, more preferably 5% or less and even more preferably 2% or less.

The break 37A of the present embodiment is formed in the transverse direction orthogonal to the longitudinal direction. The break 37A may be formed in the direction obliquely intersecting the extending direction L as long as the break 37A can divide the extension 36.

While the present embodiment includes one extension 36 along the longitudinal direction, the foamed resin molded body may include a plurality of extensions 36 as needed, and may include one or more extensions in the transverse direction or in any direction different from these directions.

When heat is input to (the input heat is released from) vehicular seat member 10, the foamed resin molded body 30 has different amounts of apparent thermal expansion (thermal contraction) between the rim part 35 where the frame member 20 is embedded and the extension 36 without the frame member 20 and extending inside of the rim part 35. This causes compressive stress or tensile stress as thermal stress non-uniformly acting on the extension 36 surrounded by the rim part 35, so that a center of the extension 36 tends to deform while bending upward, for example. Especially such a phenomenon is conspicuous for the extension 36 that extends in the longitudinal direction.

The extension 36 of the present embodiment extending inside of the rim part 35 has the break 37A that divides the extension 36, so that the extension 36 includes the divided parts 36a and 36a and each divided part 36a has a free end. This can suppress thermal stress acting on the extension 36 when the extension 36 thermally expands or contracts, and so the dimensional accuracy of the vehicular seat member 10 can be kept.

It should be noted here that the extension 36 of the present embodiment has both ends that are bound to the rim part 35 where the second frame part 22 is embedded. Such an extension 36 is particularly easily deformed due to thermal expansion and thermal contraction. When the frame member 20 circles around along the outer shape S of the vehicular seat member 10 without gaps, the extension 36 is deformed more easily. Even in such a case, the extension 36 of the present embodiment has the break 37A as stated above so that the divided parts 36a can expand or contract independently along the extending direction L, which can more effectively suppress the deformation of the extension 36.

2. Method for Manufacturing Vehicular Seat Member 10

Figure 5:
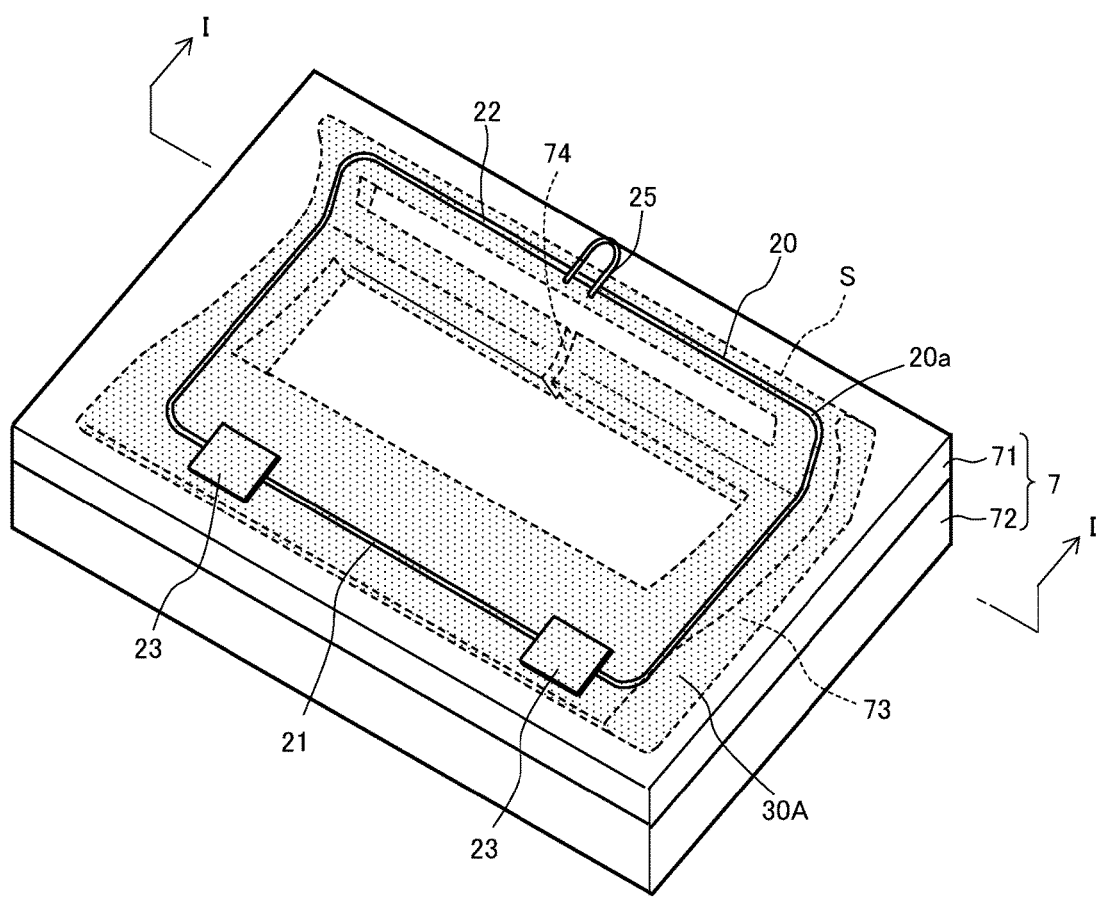
FIG. 5 is a schematic perspective view to explain the method for manufacturing a vehicular seat member in FIG. 1.
Figure 6:
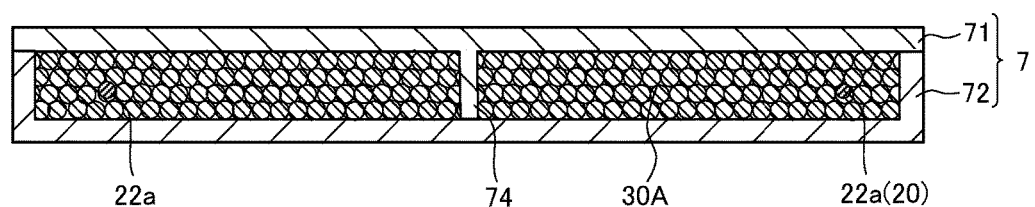
FIG. 6 is a schematic cross-sectional view taken along the arrow I-I of FIG. 5.
Figure 6:
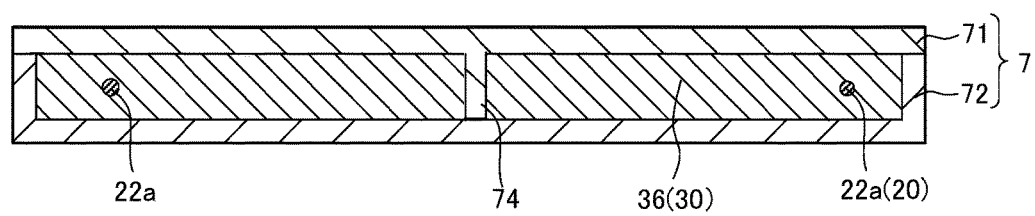
Figure 6:
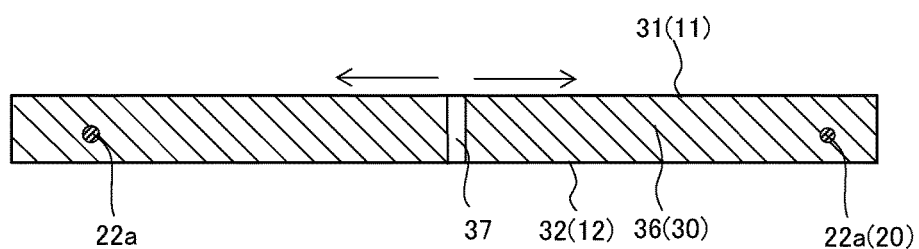
Figure 7:
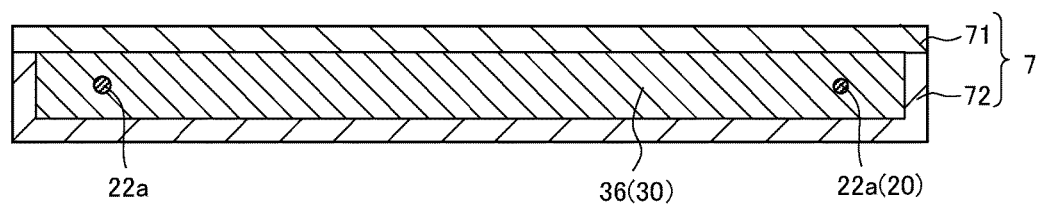
FIG. 7 shows a method for manufacturing a vehicular seat member as a comparative example.
Figure 7:
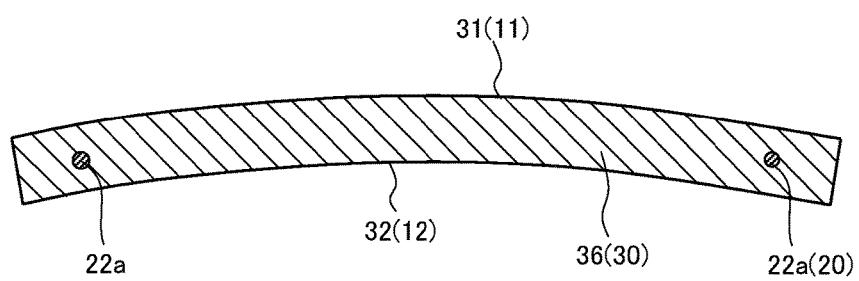

Referring to FIG. 5 and FIG. 6, the following describes a method for manufacturing the vehicular seat member 10. FIG. 5 shows the frame member 20 with solid lines for the sake of convenience. As shown in FIG. 5, the vehicular seat member 10 of the present embodiment is manufactured by placing the frame member 20 in a cavity 73 of a molding die 7. Next expandable resin particles including resin and foaming agent are pre-expanded, and the molding die is filled with such pre-expanded resin particles 30A, followed by supplying of steam into the molding die 7 so as to expand the pre-expanded resin particles 30A to form a foamed resin molded body 30. After that, the foamed resin molded body 30 is cooled in the molding die 7, and then the foamed resin molded body 30 together with the frame member 20 is released from the molding die 7, and heat remaining in the foamed resin molded body 30 is released (the foamed resin molded body is allowed to cool).

Note here that the foamed resin molded body 30 typically has a property of slightly contracting during releasing of the remaining heat generated by foam molding after releasing from the mold. On the contrary, the frame member 20 made of a material, such as metal, does not change substantially in dimensions as compared with the foamed resin molded body 30 before and after the forming of the foamed resin molded body 30. While the foamed resin molded body 30 is formed in the molding die 7 including a first die 71 and a second die 72 as shown in FIG. 7(a) and then the foamed resin molded body 30 is released from the molding die 7 and heat of the foamed resin molded body 30 is released as shown in FIG. 7(b), the foamed resin molded body 30 therefore thermally contracts. At this time, the both ends of the extension 36 without the frame member 20 are bound to the rim part 35 with the frame member 20, and this causes compressive stress or tensile stress as thermal stress non-uniformly acting on the extension 36, so that a center of the extension 36 tends to deform while bending upward. Such deformation of the foamed resin molded body 30 after molding will be kept after the heat release as well.

In view of this, the present embodiment manufactures the vehicular seat member 10 as follows. Firstly a frame member 20 is prepared. The structure and the material of the frame member 20 are as stated above. Next as shown in FIG. 5, the frame member 20 is placed in the molding die 7 so that the frame member 20 extends along the outer shape S of the vehicular seat member 10 in plan view of the vehicular seat member 10 (placing step).

As shown in FIGS. 5 and 6(a), the molding die 7 includes the first die 71 and the second die 72. When the first die 71 and the second die 72 are clamped, a cavity 73 suitable for the foamed resin molded body 30 is defined inside of the molding die 7. To form the extension 36, the first die 71 has a partition 74 along the direction (transverse direction) intersecting the extending direction L (longitudinal direction) where the extension 36 extends.

Next as shown in FIG. 6(a), the first die 71 and the second die 72, inside of which the frame member 20 is placed, is temporarily clamped (cracking), followed by filling with pre-expanded resin particles 30A prepared by pre-expanding expandable resin particles including resin and foaming agent, and clamping.

Next as shown in FIG. 6(b), the cavity 73 of the molding die 7 is heated by steam, for example, for secondary foaming of the pre-expanded resin particles 30A so as to fill gaps between the pre-expanded resin particles 30A and fusion-bond the pre-expandable resin particles 30A mutually for integration, thus forming the foamed resin molded body 30 (forming step).

This can form the foamed resin molded body 30 including the rim part 35 and the extension 36 in the molding die 7. The formed rim part 35 embeds the frame member 20 and defines the outer shape S of the vehicular seat member 10. The formed extension 36 extends from the inside of the rim part 35 so as to bridge the rim part 35 inside of the rim part 35. At the same time, the partition 74 forms the break 37A in the extension 36 so as to divide the extension 36 along the direction intersecting the extending direction L of the extension 36.

Next the foamed resin molded body 30 in the molding die 7 is cooled by water or is allowed to stand for cooling. The foamed resin molded body 30 is then released from the molding die 7, whereby the vehicular seat member 10 of the present embodiment including the foamed resin molded body 30 integral with the frame member 20 can be obtained. During the releasing of the foamed resin molded body 30 from the molding die 7 and after the releasing, the foamed resin molded body 30 releases the remaining heat after forming and so contracts.

Due to the break 37A dividing the extension 36 along the direction intersecting the extending direction L, the extension 36 of the present embodiment includes a pair of divided parts 36a and 36a, and each divided part 36a has a free end. This can suppress thermal stress acting on the extension 36 when the extension 36 thermally contracts because the divided parts 36a contract independently. As a result, the vehicular seat member 10 manufactured can have excellent dimensional accuracy.

As shown in FIG. 5, the frame member 20 of the present embodiment has the second frame part 22, and the second frame part 22 has the opposed parts 22a and 22a across the space inside of the rim part 35 so that the opposed parts are continuous to define a continuous part. The foamed resin molded body 30 is formed so as to include the extension 36 that extends between the opposed parts 22a and 22a. Both ends of the extension 36 therefore are bound to the rim part 35 where the second frame part 22 is embedded, and so the extension 36 in this form easily deforms due to thermal contraction. Particularly the frame member 20 circles around along the outer shape S of the vehicular seat member 10 without gaps, and so such a deformation easily occurs. Even in such a case, the extension 36 of the present embodiment has the break 37A that is formed by the forming step and can suppress the deformation.

The present embodiment forms the break 37 in the extension 36 during the forming (forming step) of the foamed resin molded body 30. Instead, the break dividing the extension 36 may be formed in the extension 36 after the forming step. Note here that the timing to form the break 37 is preferably within a duration before the ending of cooling (allowed to stand for cooling) of the foamed resin molded body 30, e.g., within the duration of about 60 minutes after the forming step.

<Second Embodiment>

Figure 8:
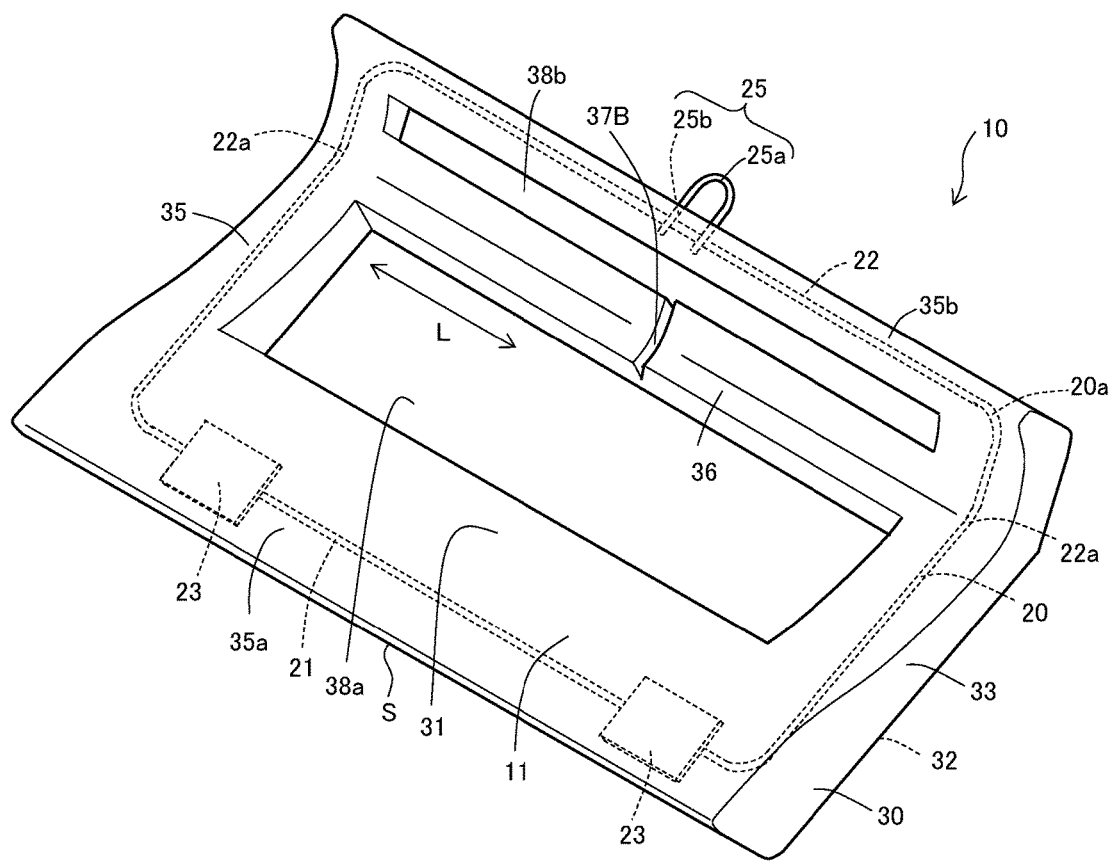
FIG. 8 is a schematic perspective view from the above of a vehicular seat member according to a second embodiment of the present invention.
Figure 9:
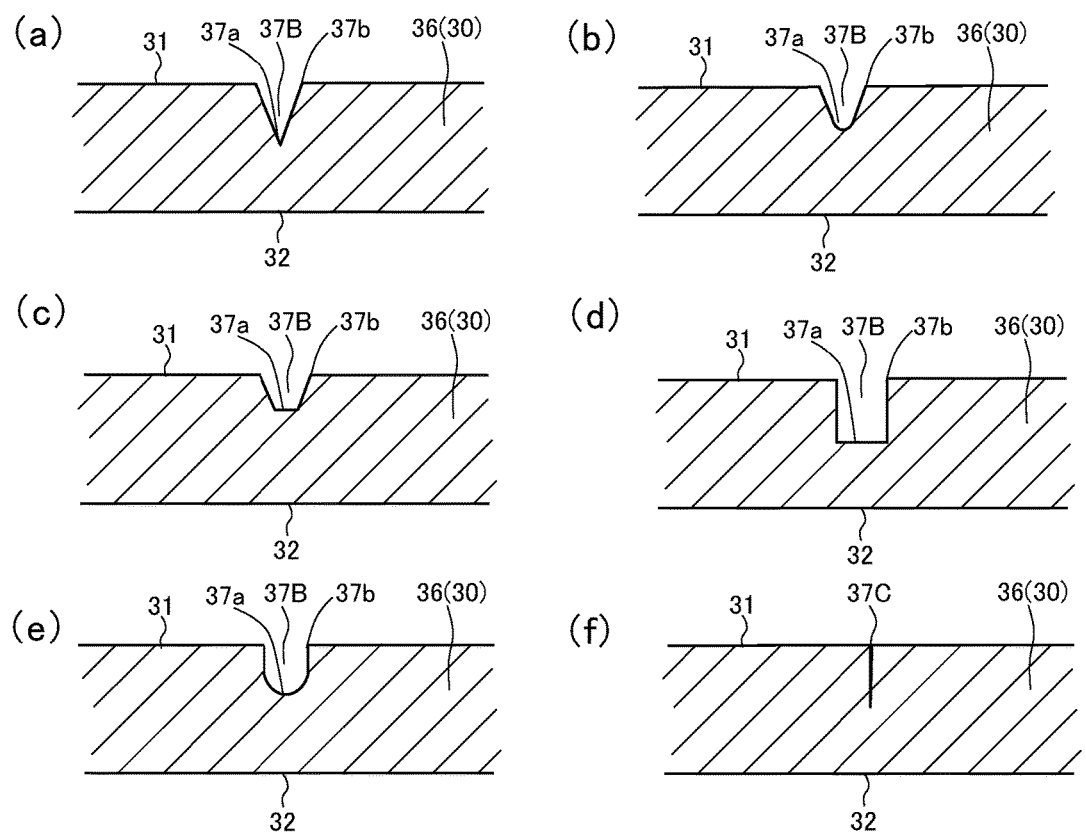
FIG. 9($a$) is a schematic cross-sectional view of a cutout groove and the vicinity thereof shown in FIG. 8, FIG. 9($b$) to ($e$) shows modified examples of the cutout groove in FIG.

Referring to FIG. 8 and FIG. 9, the following describes a vehicular seat member 10 and a method for manufacturing the vehicular seat member that is a second embodiment of the present invention. The vehicular seat member 10 of the second embodiment is different from the first embodiment in that the extension 36 has a cutout groove 37B or a notch 37C instead of the break 37A. Like reference numerals therefore designate like parts of the first embodiment, and their description is omitted. In this description, a "break" refers to a part that divides the extension, and a "cutout groove" and a "notch" refer to a part that does not divide the extension 36 (so as to leave a continuous part in the extension 36).

As shown in FIG. 8, the extension 36 of the present embodiment has the cutout groove 37B along the direction intersecting the extending direction L of the extension 36. More specifically the extension 36 of the present embodiment extends along the longitudinal direction of the vehicular seat member, and the cutout groove 37B extends in the transverse direction orthogonal to the longitudinal direction. Similarly to the break 37A, the direction of the cutout groove 37B is not limited especially as long as it intersects the extending direction L of the extension 36.

As shown in FIG. 9(a), the cutout groove 37B widens from the bottom 37a toward the opening 37b in the cross section orthogonal to the extending direction L of the cutout groove 37B.

In this way, the cutout groove 37B of the present embodiment widens from the bottom 37a toward the opening 37b. This can release thermal stress (tensile stress or compressive stress) acting on the surface of the extension 36 or the vicinity along the extending direction L during thermal expansion and thermal contraction, and can suppress thermal deformation to bend the extension 36.

The cutout groove 37B of the extension 36 is preferably located at a position where the extension 36 thermally deforms the most when the extension 36 does not have the cutout groove 37B. The cutout groove is desirably located on the surface of the extension 36 that deforms while bending, especially on the surface on the protruding side. This can suppress thermal deformation of the extension 36 more effectively. The extension 36 may have a plurality of cutout grooves 37B side by side along the extending direction L. This allows a plurality of cutout grooves 37B having shallower cutouts to suppress thermal deformation of the extension 36, such as bending, more effectively, and also can keep enough strength of the extension. Particularly such a plurality of cutout grooves 37B is preferably configured so that the depth of these cutout grooves 37B reduces from the end of the extension 36 toward the center.

In the modified example of the cutout groove 37B of the present embodiment, the bottom 37a of the groove may have a concave curve as shown in FIG. 9(b), for example. This can reduce the concentration of stress to the bottom 37a of the groove. In other modified examples of the cutout groove 37B, the cutout groove 37B may have a trapezoidal shape or a rectangular shape in cross section as shown in FIG. 9(c) and FIG. 9(d), respectively. As shown in FIG. 9(e), the bottom 37a of the rectangular cutout groove 37B may have a concave curve. As shown in FIG. 9(f), the extension may have a notch (slit) 37c instead of the cutout groove 37B.

Similarly to the first embodiment, the vehicular seat member 10 is manufactured by placing a frame member 20 in a cavity of a molding die. Next expandable resin particles including resin and foaming agent are pre-expanded, and the molding die is filled with such pre-expanded resin particles, followed by supplying of steam into the molding die 7 so as to expand the pre-expanded resin particles to form a foamed resin molded body 30. In the present embodiment, the first die 71 has a protrusion protruding toward the second die 72 in accordance with the cutout groove 37B instead of the partition 74 of the first die 71 shown in FIG. 6(a). This can form the cutout groove 37B in the extension 36 of the foamed resin molded body 30. To form the notch 37C, the first die 71 may have a thin plate protruding toward the second die 72 in accordance with the shape of the notch 37C.

After that, the foamed resin molded body 30 together with the frame member 20 is released from the molding die, and the foamed resin molded body 30 is allowed to stand for cooling. In the present embodiment, the extension 36 extending inside of the rim part 35 has the cutout groove 37B or the notch 37C along the direction intersecting the extending direction L, which can release thermal stress acting on the surface of the extension 36 and can suppress the deformation of the extension 36.

The present embodiment forms the cutout groove 37B or the notch 37C during the forming in the extension 36 (forming step) of the foamed resin molded body 30. Instead, the cutout groove 37B or the notch 37C may be formed in the extension 36 after the forming step. Note here that the timing to form the cutout groove 37B or the notch 37C is preferably within a duration before the ending of cooling (allowed to stand for cooling) of the foamed resin molded body 30, e.g., within the duration of about 60 minutes after the forming step.

The extension 36 as stated above has one of the cutout groove 37B, the notch 37C or the break 37A. Instead, the extension 36 may have a plurality of them of one type or the extension 36 may have two or more types selected from the cutout groove 37B, the notch 37C and the break 37A, including a single piece or a plurality of pieces for each type. The following describes examples of this embodiment.

<Other Embodiments>

Referring to FIGS. 10 to 13, the following describes other embodiments of the present invention. In the configuration of the vehicular seat member 10 according to these embodiments, like reference numerals designate like parts of the first embodiment and the second embodiment, and their description is omitted.

Figure 10:
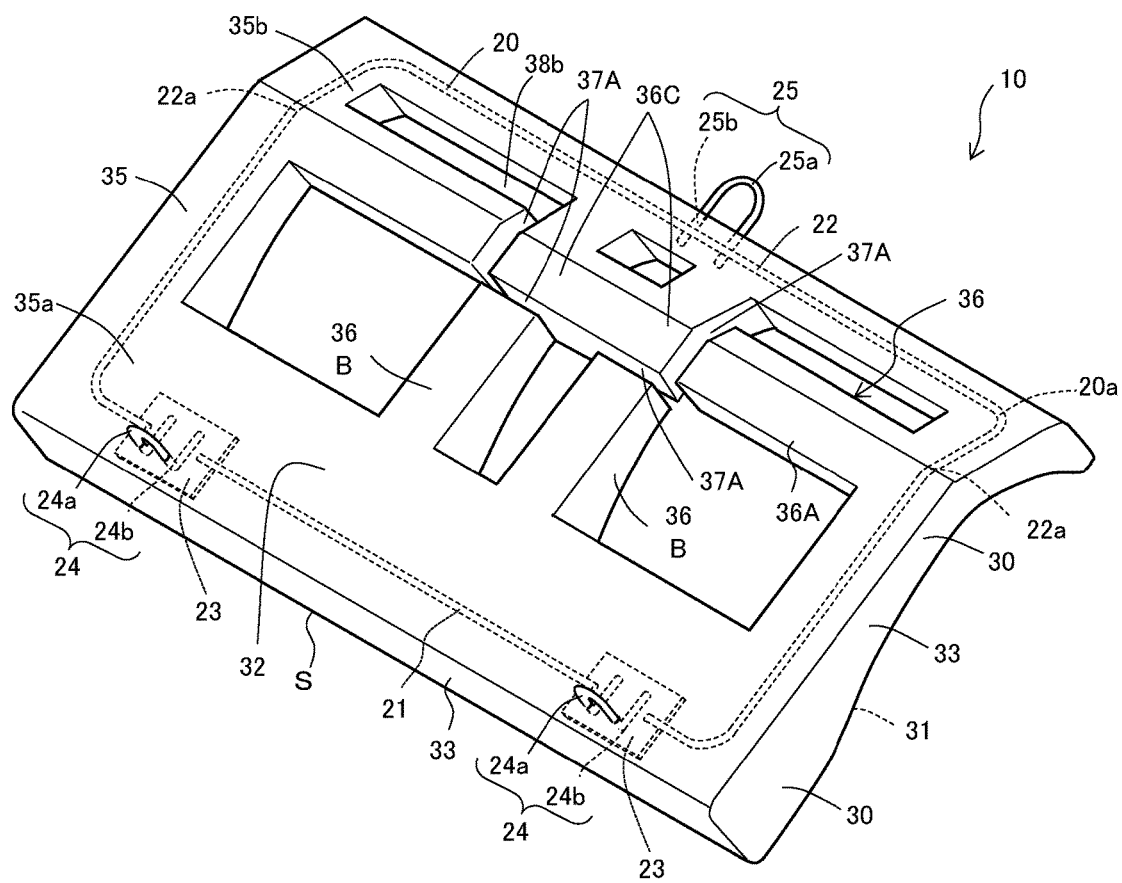
FIG. 10 is a schematic perspective view from the below of a vehicular seat member according to another embodiment of the present invention.

As shown in FIG. 10, the extension 36 of the vehicular seat member 10 of the present embodiment has a first extension part 36A extending in the longitudinal direction and two of second extension parts 36B and 36B extending in the transverse direction. The first extension part 36A and the second extension parts 36B link via a linking part 36C, and the first extension part 36A and the second extension parts 36B define four (a plurality of) breaks 37A therebetween along the extending direction of the extensions and the intersecting direction.

In this way, the foamed resin molded body includes the first extension part 36A and the second extension parts 36B that mutually intersect inside of the rim part 35, and this can reinforce the vehicular seat member 10. All of the first extension part 36A and the second extension parts 36B have a break 37A, and this can suppress thermal deformation, such as bending, in the first extension part 36A and the second extension parts 36B. This can suppress deformation of the first extension part 36A and the second extension parts 36B after forming as well, which results from thermal contraction of the foamed resin molded body 30.

Figure 11:
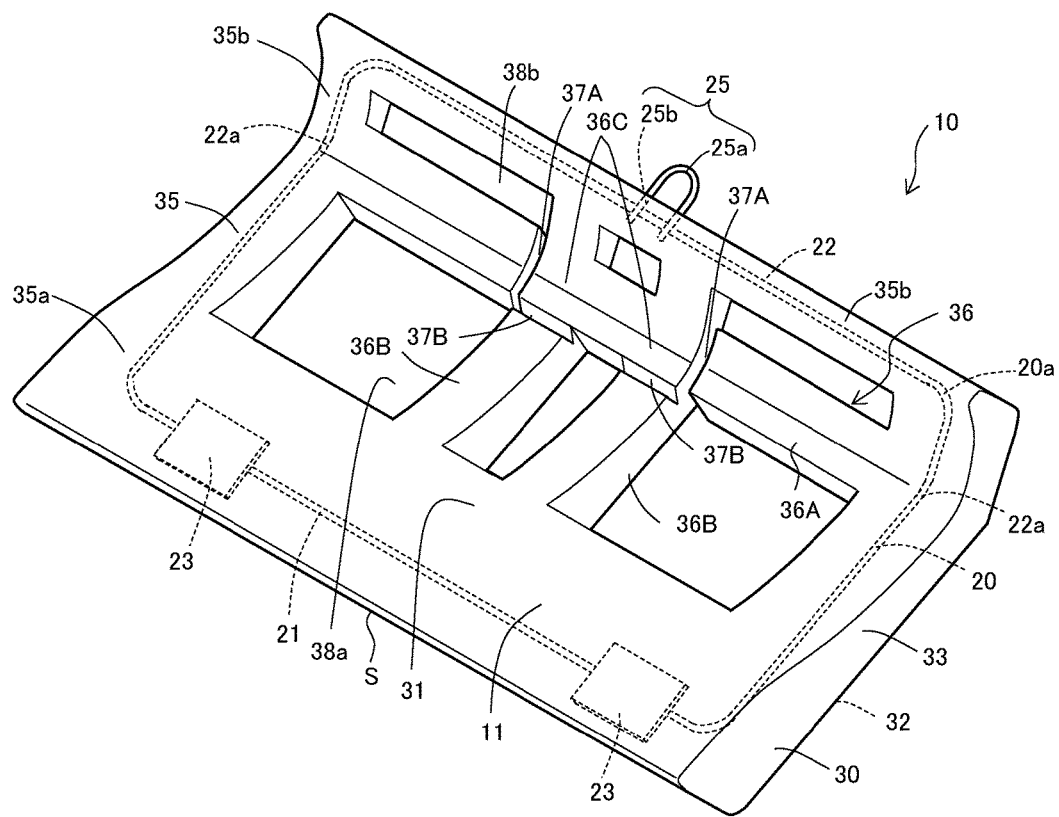
FIG. 11 is a schematic perspective view from the above of a vehicular seat member according to a modified example of the vehicular seat member shown in FIG. 10.

In the embodiment shown in FIG. 10, both of the first extension part 36A and the second extension parts 36B have the break 37A. As shown in FIG. 11, in another example, the second extension parts 36B extending in the transverse direction may include the cutout groove 379 instead of the break 37A. A break 37A of the first extension part 36A can suppress thermal deformation of the first extension part 36A more reliably, which thermally deforms more easily than the second extension parts 36B. The cutout groove 37B of the second extension parts 36B, which thermally deforms less than the first extension part 36A, can suppress thermal deformation of the second extension parts while keeping enough strength there.

Figure 12:
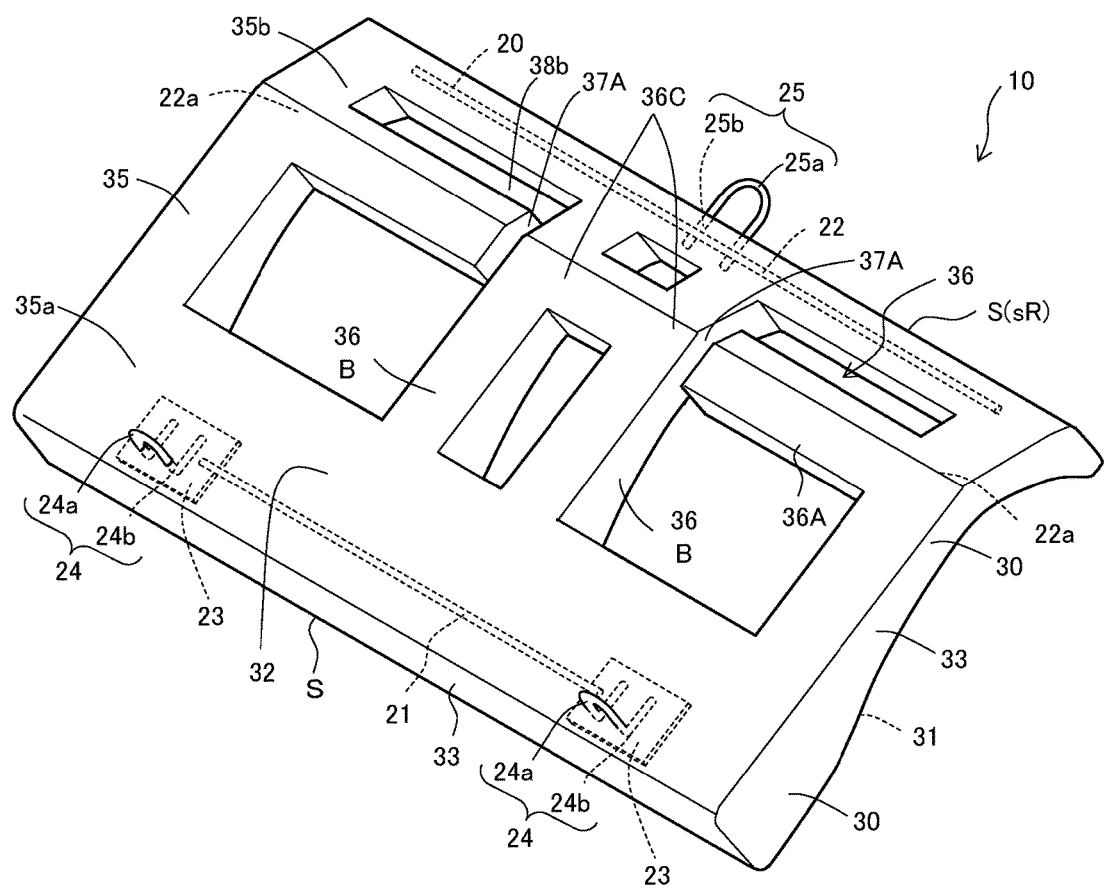
FIG. 12 is a schematic perspective view from the below of a vehicular seat member according to another embodiment of the present invention.

In the present embodiment shown in FIG. 10, the frame member 20 circles around along the outer shape S of the vehicular seat member 10 without gaps. The frame member 20 may be placed at least at a part along the outer shape S of the vehicular seat member 10. In this case, the second frame part 22 does not join to the bases 23 and 23 and is placed along the rear edge sB only as shown in FIG. 12, and the breaks 37A may be formed in the first extension part 36A only. In this case, the first extension part 36A extending in the longitudinal direction may have the breaks 37A.

Figure 13:
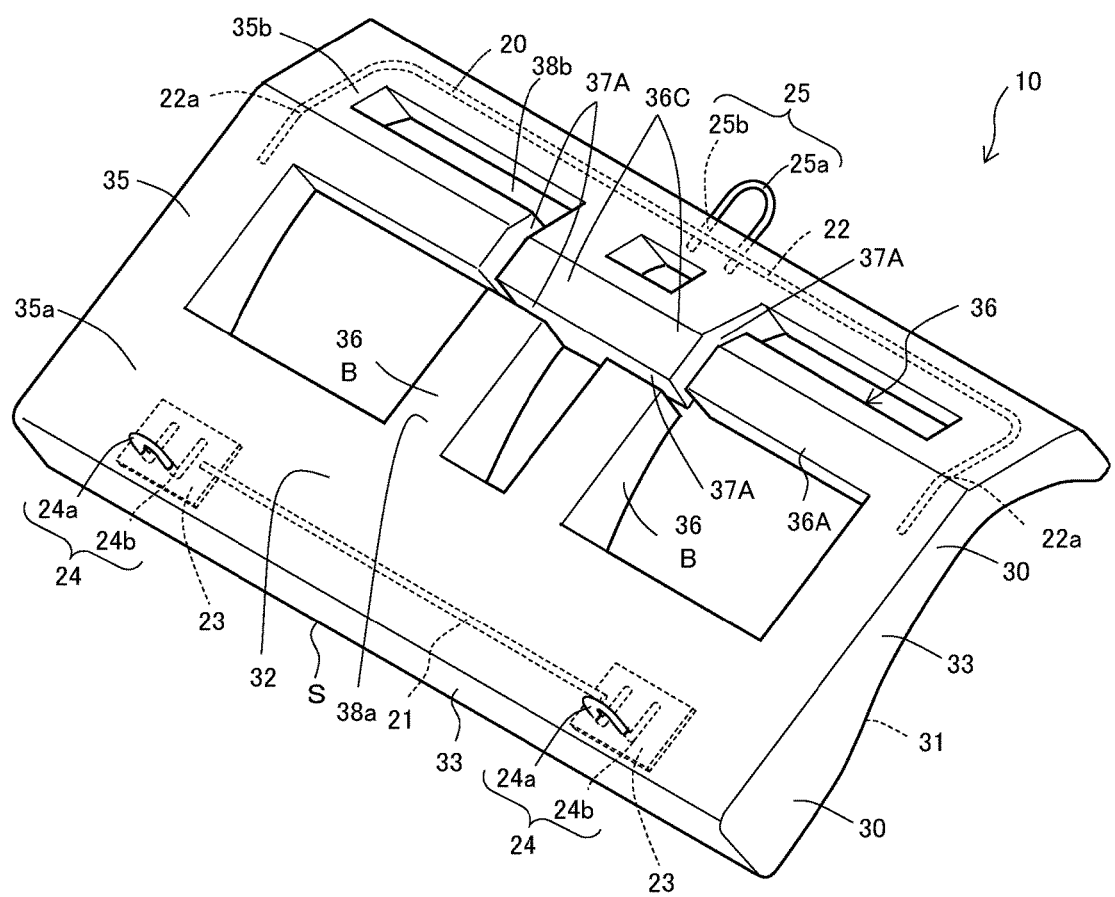
FIG. 13 is a schematic perspective view from the below of a vehicular seat member according to another embodiment of the present invention.

As shown in FIG. 13, the frame member 20 may terminate at opposed parts 22a and 22a that are opposed across the space inside of the rim part 35, and these opposed parts continuously define a second frame part 22 (continuous part).

<Third Embodiment>

Figure 14:
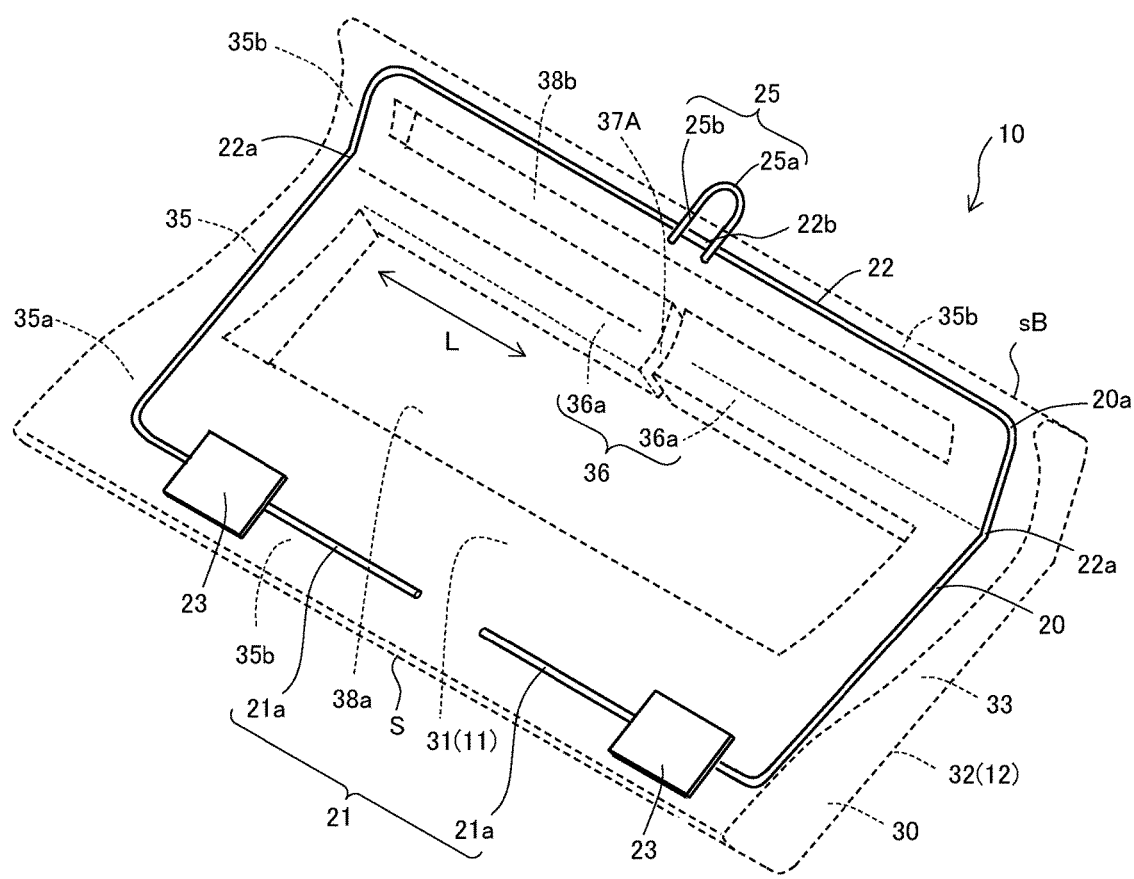
FIG. 14 is a schematic perspective view from the above of a vehicular seat member according to a third embodiment of the present invention.
Figure 15:
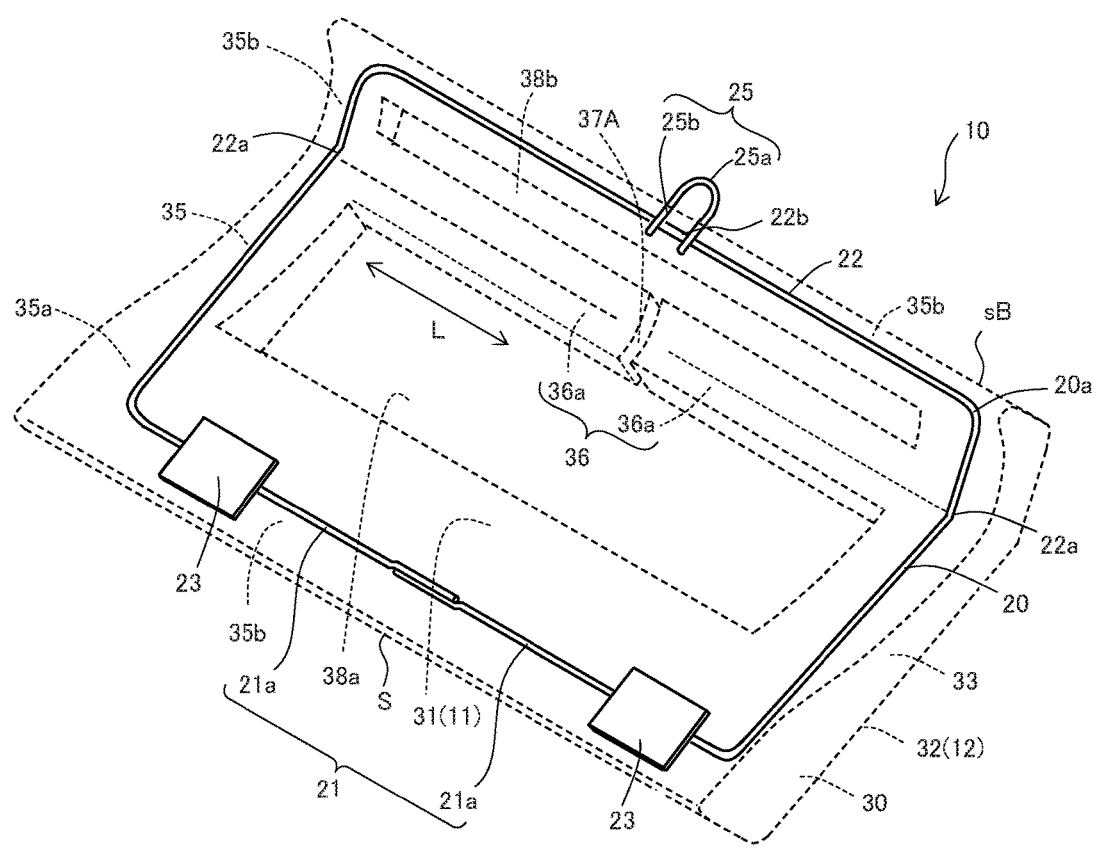
FIG. 15 is a schematic perspective view from the above of a vehicular seat member according to a modified example of the vehicular seat member shown in FIG. 14.

Referring to FIG. 14 and FIG. 15, the following describes a vehicular seat member 10 and a method for manufacturing the vehicular seat member that is a third embodiment of the present invention. The vehicular seat member 10 of the third embodiment is different from the first embodiment in the shape of the frame member 20. Like reference numerals therefore designate like parts of the first embodiment, and their description is omitted.

As shown in FIG. 14, the first frame part 21 of the present embodiment is disposed between a pair of front locking parts (locking attachments) 24 and 24 via the bases 23, and the first frame part 21 is divided into two frame parts 21a and 21a. That is, unlike the first embodiment, the body 20a of the frame member 20 is divided between the front locking parts (locking attachments) 24 and 24 of the frame member 20, and the frame member is not a continuous loop. The frame parts 21a and 21a make up a part of the body 20a of the frame member 20 at a long-side part on one side. In the present embodiment, the opposed distal ends of the frame parts 21a and 21a are spaced from each other.

Such a vehicular seat member 10 can be manufactured in the manufacturing method as stated above by preparing a frame member 20 that is divided between the front locking parts (locking attachments) 24 and 24 as shown in FIG. 14, and placing the frame member into the molding die for integral molding with the foamed resin molded body 30.

The frame member 20 of the present embodiment is configured so that one of the frame parts 21a is fixed to one of the front locking part 24 and the other frame part 21a is fixed to the other front locking part 24 at the section sandwiched between the pair of front locking parts (locking attachments) 24 and 24 where the first frame part 21 of the frame member 20 is disposed, and the one frame part 21a and the other frame part 21a are spaced from each other. These divided frame parts 21a of the first frame part 21 can absorb a difference in the amount of thermal contraction between the foamed resin molded body 30 and the frame member 20.

As a result, the present embodiment can suppress deformation of the frame member 20 and/or the foamed resin molded body 30, which results from thermal contraction when the foamed resin molded body 30 releases heat generated during forming, and so the vehicular seat member 10 can keep a predetermined overall shape. The present embodiment also can suppress deformation due to thermal contraction and thermal expansion during the usage of the vehicular seat member 10.

In this way, these divided pair of frame parts 21a, 21a of the first frame part 21 can absorb deformation of the body 20a of the frame member 20 and of the rim part 35 of the foamed resin molded body 30. Meanwhile the break 37A of the extension 36 absorbs deformation of the extension 36 of the foamed resin molded body 30. As a result, the present embodiment can suppress overall thermal deformation of the vehicular seat member 10.

The pair of divided frame parts 21a and 21a may overlap each other at the distal ends as shown in the modified example of FIG. 15. As shown in FIG. 15, this can keep the strength of the body 20a of the frame member 20 as compared with the case of the spaced distal ends of the frame parts 21a and 21a. Such an overlapping part of the pair of frame parts 21a and 21a can increase the strength of the body 20a of the frame member 20 even in the configuration of the first frame part 21 that is divided.

The extension 36 of the present embodiment has the break 37A. The extension 36 may have the cutout groove 37B or the notch 37C shown in the other examples, and the extension 36 may have at least one of the break 37A, the cutout groove 37B and the notch 37C. The configuration shown in FIG. 10 to FIG. 13 may include the pair of divided frame parts 21a and 21a as in the present embodiment.

<Fourth Embodiment>

Figure 16:
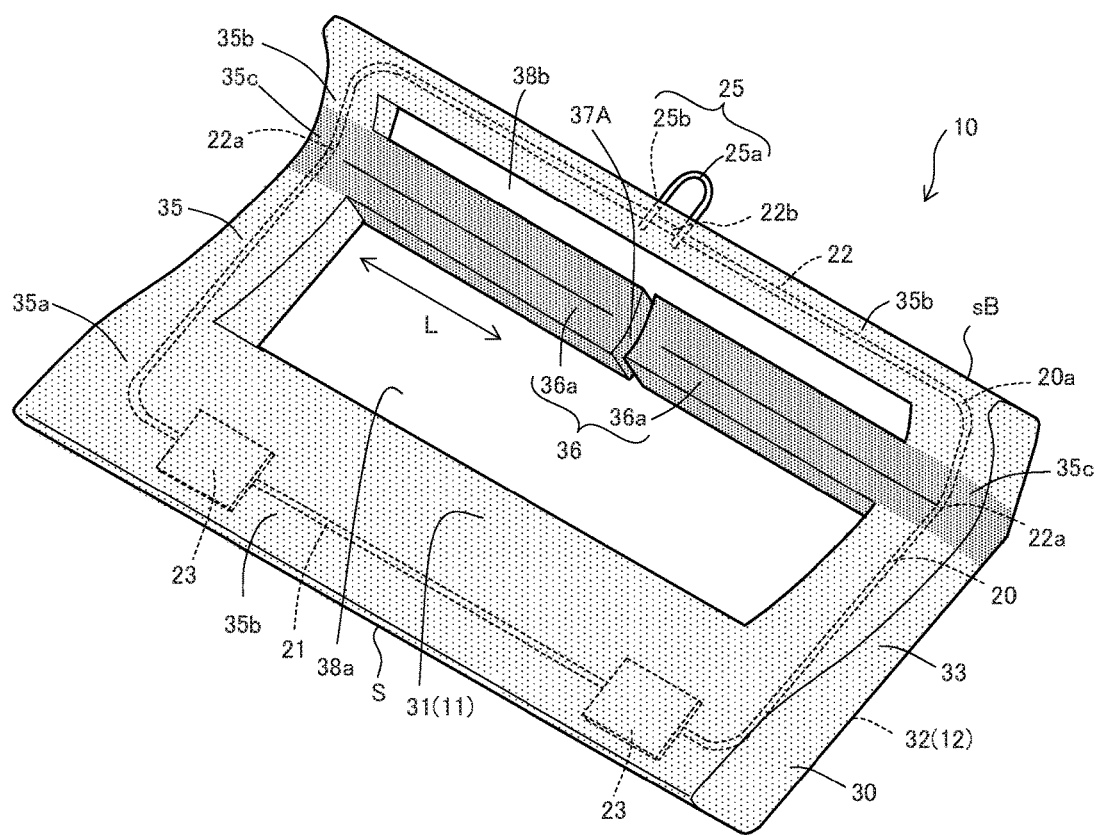
FIG. 16 is a schematic perspective view from the above of a vehicular seat member according to a fourth embodiment of the present invention.
Figure 17:
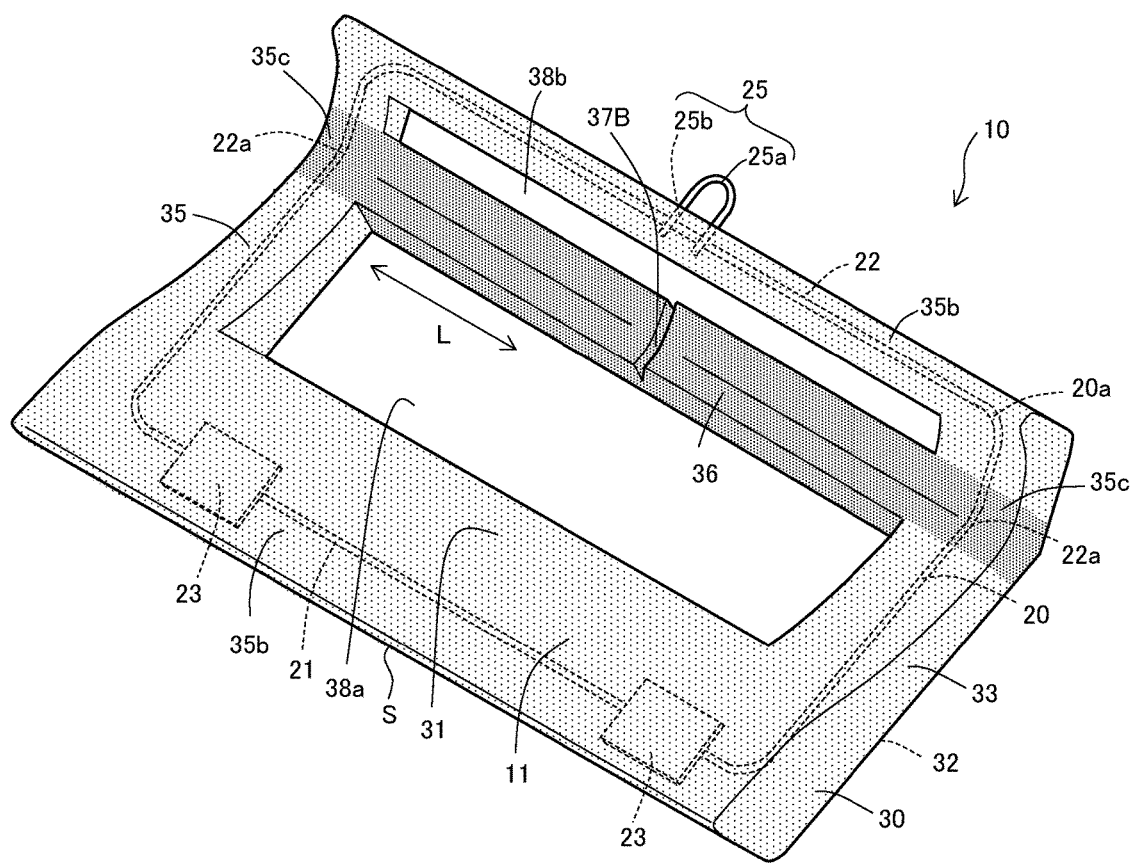
FIG. 17 is a schematic perspective view from the above of a vehicular seat member according to a modified example of the vehicular seat member shown in FIG. 16.

Referring to FIG. 16 and FIG. 17, the following describes a vehicular seat member 10 and a method for manufacturing the vehicular seat member that is a fourth embodiment of the present invention. The vehicular seat member 10 of the fourth embodiment is different from the first embodiment in the shape of the foamed resin molded body 30. Like reference numerals therefore designate like parts of the first embodiment, and their description is omitted.

The foamed resin molded body 30 of the present embodiment includes an extension 36 and a connecting part 35c of the rim part 35 connecting to the extension 36 that are made of expandable resin having larger maximum point stress by bending than that of expandable resin at other parts (not-connecting parts of the rim part 35). Note here that the maximum point stress by bending of expandable resin can be controlled easily by changing the expansion ratio of the resin, for example. More specifically expandable resin of the extension 36 and of the connecting part 35c of the rim part 35 has density higher than that of the expandable resin at other parts.

The maximum point stress by bending (kPa) of expandable resin in the present embodiment is a value measured according to the bending test specified by procedure A of ASTM D790. The specific conditions of the bending test are as follows:

Testing machine: Tensilon universal tester, UCT-10T supplied by Orientec. Co., Ltd;
Test piece: 79.2 W×380 L×19.8 T thickness (mm) (without skin);
The number of times of test: 5;
Test speed: 8.4 mm/min;
Distance between supporting points: 316.7
Maximum deflection: 64 mm:
Jigs at distal ends: supporting wedge . . . 5R, pressing wedge . . . 5R; and
Conditions of test pieces, test environment: temperatures: 23±2° C., relative humidity (RH): 50±10%, 24 hours or longer The maximum point stress by bending of the expandable resin at the not-connecting parts of the rim part 35 of the foamed resin molded body 30, which is measured by the same conditions as above, is not limited especially, which may be in the range of 10 to 600 kPa, and typically in the range of 100 to 500 kPa, for example. The maximum point stress by bending of the expandable resin at least at the extension 36 of the foamed resin molded body 30, which is measured by the same conditions as above, is higher than that of the expandable resin at the non-connecting parts of the rim part 35. For instance, it may be 1.2 to 5 times, and typically 1.5 to 4 times the maximum point stress by bending of the expandable resin at the not-connecting parts of the rim part 35, for example.

The absolute values of the maximum point stress by bending of the expandable resin at the extension 36 and at the connecting parts 35c, which is measured by the same conditions as above, are 150 to 2000 kPa, and typically 250 to 1200 kP, for example. The resins for expandable resin of these parts of the foamed resin molded body 30 may be selected from the resins of types as stated above, and they are not necessarily of the same type. The foamed resin molded body 30 as a whole preferably includes the molded foam of resins of the same type because the parts of the foamed resin molded body 30 can be joined firmly. Preferably the foamed resin molded body 30 as a whole includes the molded foam of resins that are of the same type but are different in maximum point stress by bending because the parts of the foamed resin molded body 30 can be joined more firmly.

To form the foamed resin molded body 30 with expandable particles of the same material, the forming is as follows. Specifically a part of the cavity of the molding die that corresponds to the part of the foamed resin molded body 30 that has to be made of expandable resin having large maximum point stress by bending is filled with pre-expanded resin particles having a small bulk expansion ratio. On the contrary, a part of the cavity of the molding die that corresponds to the parts other than the part of the foamed resin molded body 30 made of expandable resin having large maximum point stress by bending is filled with pre-expanded resin particles having a bulk expansion ratio relatively larger than the former.

Next as stated above, the cavity of the molding die is heated by steam, for example, for secondary foaming of the pre-expanded resin particles so as to fill gaps between the pre-expanded resin particles and fusion-bond the pre-expandable resin particles mutually for integration, thus forming the foamed resin molded body 30.

This can form the foamed resin molded body 30 including the rim part 35 and the extension 36 in the molding die. The foamed resin molded body includes the extension 36 and the connecting part 35c that are made of expandable resin having a smaller expansion ratio and having larger maximum point stress by bending than those of expandable resin at other parts.

The extension 36 of the present embodiment includes the break 37A that divides the extension 36 and so has reduced strength than that without break. The present embodiment, however, includes the extension 36 and the connecting part 35c having maximum point stress by bending larger than that of other parts, and so can keep enough strength of the extension 36.

Figure 18:
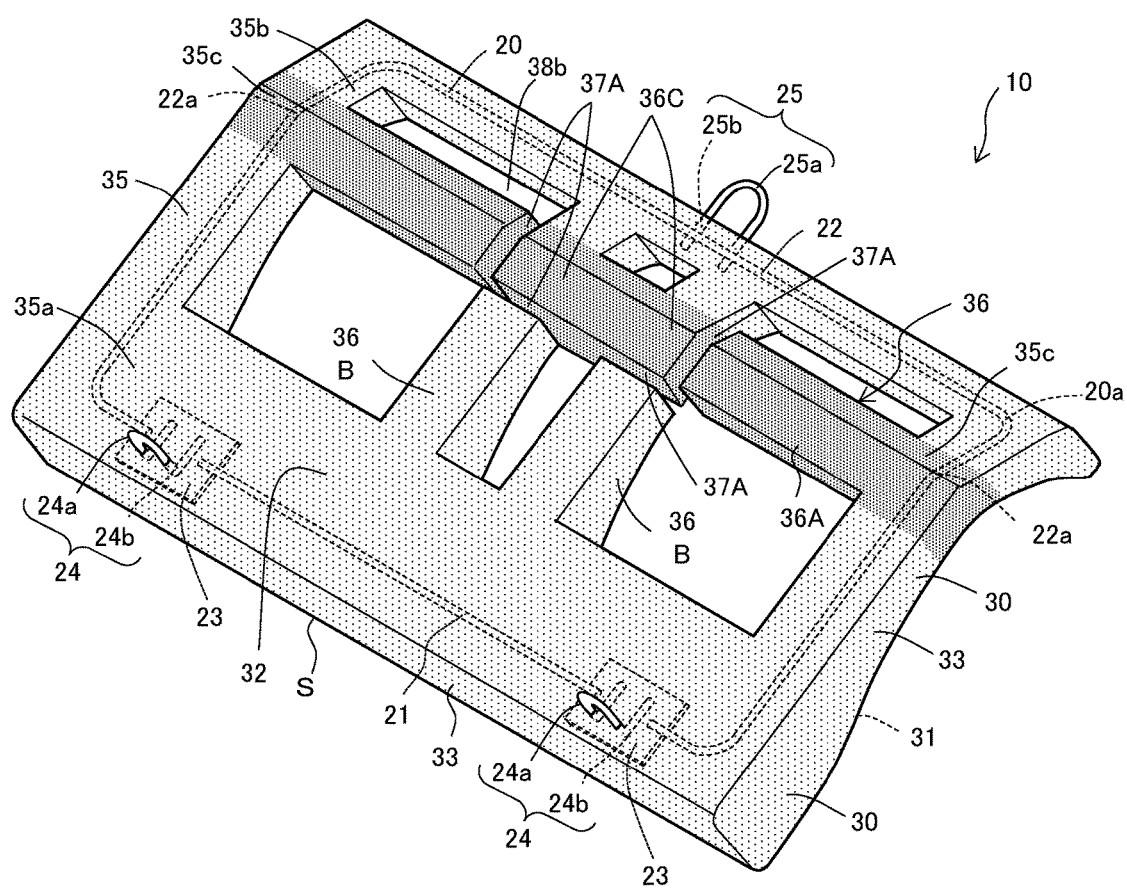
FIG. 18 is a schematic perspective view from the above of a vehicular seat member according to another modified example of the vehicular seat member shown in FIG. 16.

As in a modified example of FIG. 17, the extension 36 having a cutout groove 37B and the connecting part 35c may have maximum point stress by bending larger than that of other parts, or as shown in FIG. 18, the first extension part 36A of the extension 36 and the connecting part 35c may have maximum point stress by bending larger than that of other parts. Although the extension 36 having the cutout groove 37B may reduce the strength relatively, the above configuration can keep enough strength of the extension 36.

The extension 36 of the present embodiment has the break 37A or the cutout groove 37B. Instead, the extension 36 may have the notch 37C shown in FIG. 9(f), and the extension 36 may have at least one of the break 37A, the cutout groove 37B and the notch 37C. In the extension 36 shown in FIG. 10 to FIG. 12, the first extension part 36A and the connecting part 35c may have maximum point stress by bending that is larger than that at other parts.

That is a detailed description of the embodiments of the present invention. The present invention is not limited to the above-stated embodiment, and the design may be modified variously without departing from the spirits of the present invention.

REFERENCE SIGNS LIST

1 Vehicular seat
7 Molding die
10 Vehicular seat member
20 Frame member
20a Body
21 First frame part
22 Second frame part (continuous part)
22a Opposed part
30 Foamed resin molded body
35 Rim part
36 Extension
36a Divided part
36A First extension part
36B Second extension part
37a Bottom of groove
37b Opening of groove
37A Break
37B Cutout groove
37C Notch
L Extending direction
S Outer shape

The invention claimed is:

1. A method for manufacturing a vehicular seat member including a frame member and a foamed resin molded body to embed the frame member, the method comprising:
   a placing step of placing the frame member in a molding die so that the frame member extends along an outer shape of the vehicular seat member in plan view of the vehicular seat member; and
   a forming step of forming the foamed resin molded body in the molding die so that the foamed resin molded body has a rim part embedding the frame member and having an outer shape of the vehicular seat member and an extension extending inward from the rim part so as to bridge the rim part inside of the rim part, wherein
   during the forming step or after the forming step, at least one of a cutout groove, a notch and a break that divides the extension is formed in the extension along a direction intersecting an extending direction of the extension.

2. The method for manufacturing a vehicular seat member according to claim 1, wherein the frame member has a continuous part including opposed parts across a space inside of the rim part, and
   the forming step forms the extension so as to extend between the opposed parts.

3. The method for manufacturing a vehicular seat member according to claim 1, wherein
   the outer shape of the vehicular seat member in plan view has a shape having a transverse direction and a longitudinal direction, and
   the forming step forms the extension including a first extension part between the opposed parts of the rim part and extending at least along the longitudinal direction and forms at least one of the cutout groove, the notch and the break in the first extension part.

4. The method for manufacturing a vehicular seat member according to claim 1, wherein the cutout groove is formed so as to widen from a bottom toward an opening of the groove.

5. The method for manufacturing a vehicular seat member according to claim 1, wherein the frame member circles around along the outer shape of the vehicular seat member.

6. A vehicular seat member comprising a frame member and a foamed resin molded body to embed the frame member, wherein
   the frame member extends along an outer shape of the vehicular seat member in plan view of the vehicular seat member,
   the foamed resin molded body includes a rim part embedding the frame member and having the outer shape of the vehicular seat member, and an extension that extends inward from the rim part so as to bridge the rim part inside of the rim part, and
   the extension includes at least one of a cutout groove, a notch and a break that divides the extension along a direction intersecting an extending direction of the extension.

7. The vehicular seat member according to claim 6, wherein the frame member has a continuous part including opposed parts across a space inside of the rim part, and the extension extends between the opposed parts.

8. The vehicular seat member according to claim 6, wherein
   the outer shape of the vehicular seat member in plan view has a shape having a transverse direction and a longitudinal direction,
   the extension includes a first extension part between the opposed parts of the rim part and extending at least along the longitudinal direction, and
   at least one of the cutout groove, the notch and the break is disposed in the first extension part.

9. The vehicular seat member according to claim 6, wherein the cutout groove widens from a bottom to an opening of the groove.

10. The vehicular seat member according to claim 6, wherein the frame member circles around along the outer shape of the vehicular seat member.

* * * * *